UNITED STATES PATENT OFFICE.

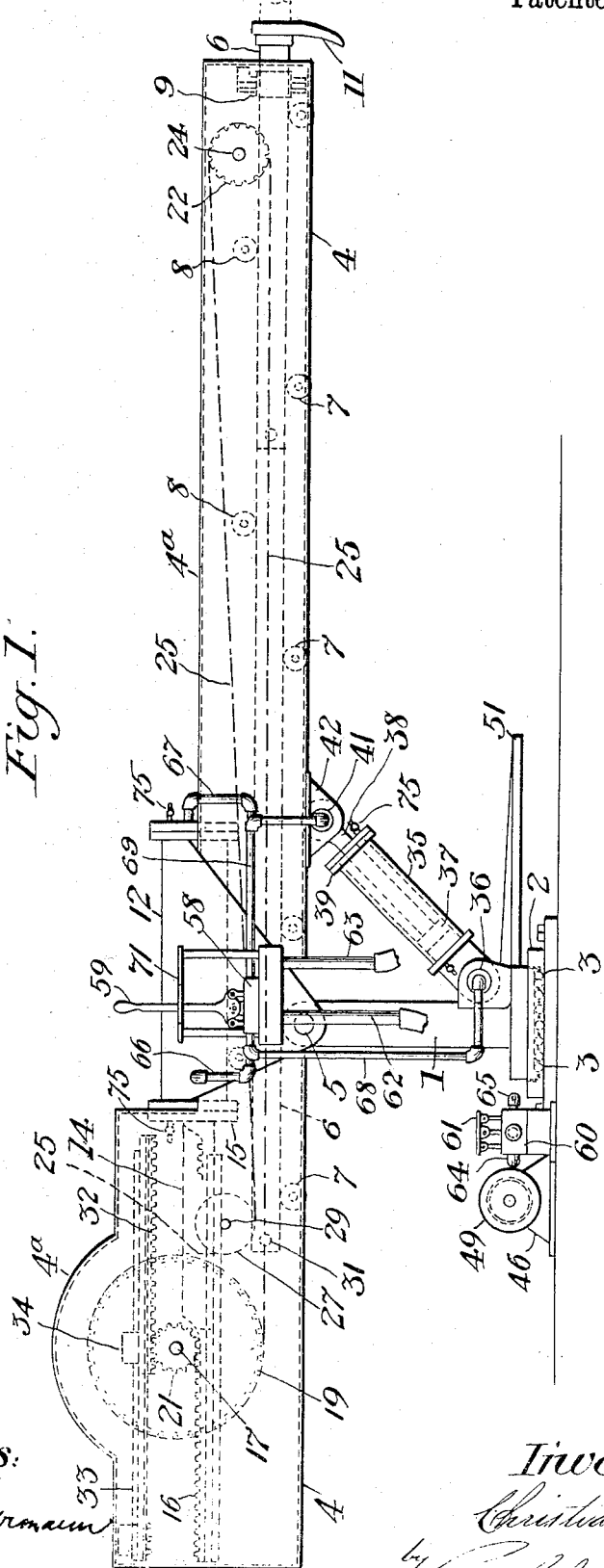

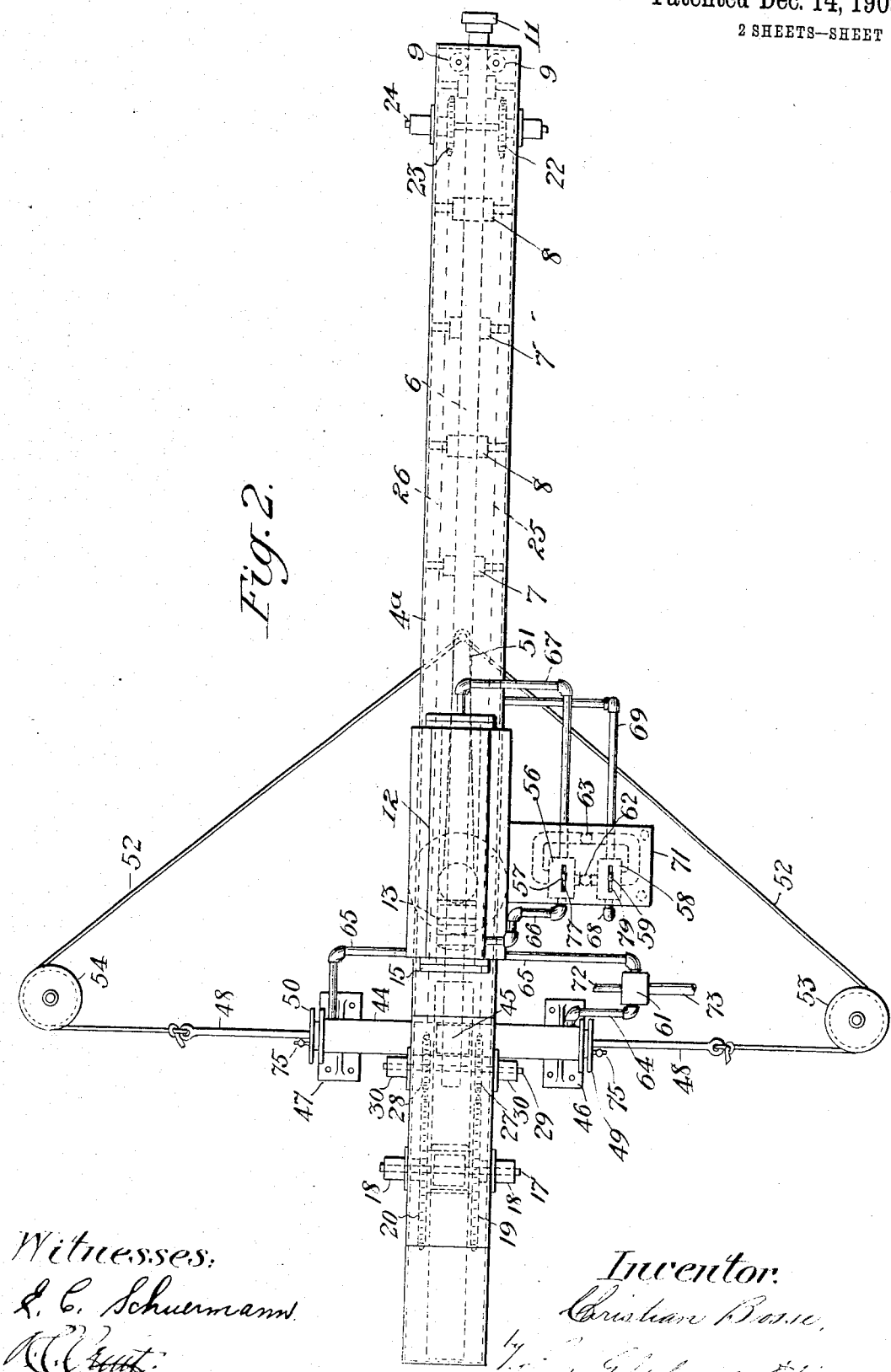

CHRISTIAN BOSSE, OF WAIPAHU, TERRITORY OF HAWAII.

CANE-UNLOADER.

943,591.  Specification of Letters Patent.  Patented Dec. 14, 1909.

Application filed October 15, 1908. Serial No. 457,958.

*To all whom it may concern:*

Be it known that I, CHRISTIAN BOSSE, a citizen of the United States, residing at Waipahu, in the county of Oahu, Territory of Hawaii, have invented certain new and useful Improvements in Cane-Unloaders; and I do hereby declare the following to be a full, clear, and exact description of the invention, such as will enable others skilled in the art to which it appertains to make and use the same.

My invention relates to apparatus, known as unloaders, for handling sugar-cane.

Unloaders are employed to drag the cane from the car or flume, by which it is brought to the mill, and feed it onto the cane-carrier, which in turn delivers it to the crushing or milling machinery.

The object of the invention is to produce an unloader which shall possess superior advantages in point of simplicity, durability and efficiency.

A particular object is to eliminate the shafting, engine or motor, and the belts or rope drive, which are necessary with the unloaders heretofore employed.

With these objects in view, the invention consists of a reciprocating rake, which can be tilted in a vertical plane or turned in a horizontal plane, all hydraulically operated.

Said invention also consists in certain novel features of construction and combination and arrangement of parts, as will hereinafter more fully appear.

In the accompanying drawings, Figure 1 represents a side elevation of an unloader embodying my invention. Fig. 2 represents a top plan view of the same.

Referring to the drawings, the standard 1 is mounted upon the base 2, and is capable of being turned about its vertical axis. Balls 3 may be employed to reduce the friction in turning. A housing 4 is pivoted to the upper end of the standard 1, so that it may be tilted in a vertical plane about the pin 5. The housing 4 as shown is of a rectangular cross-section, made of metal plates, the top 4ª being preferably removable for access to the interior mechanism. The rake-bar 6 may be moved longitudinally between the rollers 7 and 8, below and above the bar respectively, and between the side rollers 9, all of said rollers being carried by and inside of the housing 4. The rollers 7 are arranged in a series which extends longitudinally of the housing beneath the rake bar, while the rollers 8 are arranged in a similar series above the bar, the rollers of the two series being in staggered relation, as shown. The rake 11 is attached to the forward outer end of the rake-bar 6.

A cylinder 12, provided with a piston 13, is secured above the housing 4. The piston-rod 14 passes through the gland 15 and carries a rack 16 at its outer end. A transverse shaft 17 is journaled in the boxes 18 supported by the housing 4. Two sprockets 19 20 and a pinion 21 are keyed to the shaft 17, the pinion 21 meshing with the rack 16 between said sprockets. Two smaller sprockets 22 23 are keyed on the transverse shaft 24, journaled near the forward end of the housing 4. An endless chain or link-belt 25 passes around the sprockets 19 and 22, and a similar chain 26 around the sprockets 20 and 23 respectively. The sprockets above mentioned are so located that the lower portions of the chains 25 26 are on opposite sides of the rake-bar 6. Sprockets 27 28 on the shaft 29, journaled in the boxes 30 supported by the housing 4 between the cylinder 12 and the sprockets 19 20, deflect the chains 25 26 so as to clear said cylinder. The chains 25 26 are attached to the rake-bar 6 by the bolt 31.

A rack 32, sliding in guides 33 supported by the housing 4, meshes with the pinion 21, Fig. 1. The rack 32 is provided with a weight 34. The two extreme positions of the rack are indicated in dotted lines in Fig. 1.

An inclined cylinder 35, hinged at its lower end by the pin 36 to the standard 1, is provided with a piston 37. The piston-rod 38 passes through the gland 39 and its upper end is hinged by the bolt 41 to the bracket 42 attached to the underside of the housing 4, at a point in advance of the standard Fig. 1.

The cylinder 44 is provided with the piston 45, also with feet 46 47 for securing said cylinder in the position shown. The piston-rod 48 passes through the glands 49 50 at opposite ends of the cylinder 44. An arm 51 secured to the standard 1 projects horizontally therefrom. A rope 52 connects the ends of the piston-rod 48 with the arm 51, said rope passing over the sheaves 53 and 54, Fig. 2.

The valve 56, with its operating hand lever 57, is connected by the pipes 66 67 to the ends of the cylinder 12. A similar valve 58, with its similar lever 59, is connected by the pipes 68 69 to the cylinder 35. The pipe 62 connects each of these valves 56 58 with an accumulator or other source of pressure, while the water from these valves is discharged through the pipe 63. The levers 57 59 are shown passing through slots 77 79 respectively in the plate 71, whereby the movement of said levers is limited. The plate 71 may be attached to the side of the housing 4 or the cylinder 12.

The valve 60, with its operating foot plate 61, is connected by the pipes 64 65 to the cylinder 44. The pipe 72 connects the valve 60 with the source of pressure, and the pipe 73 is provided for the water discharged from valve 60.

A relief valve 75 is provided at each end of each of the cylinders 12, 35 and 44.

The mode of operation of the unloader will now be apparent. When the attendant moves the lever 57 either forward or backward, water under pressure is admitted to the cylinder 12 on one side of the piston 13, and at the same time the water on the opposite side of said piston is permitted to escape. The piston 13 therefore moves, and with it the rack 16, causing the pinion 21 to revolve the shaft 17 with sprockets 19 20. These in turn cause the chains 25 26 to move and pull the bar 6 with rake 11 either outward or inward with respect to the housing 4. As the bar 6 moves, the rack 32 and weight 34 move proportionately in the opposite direction, thus automatically counterbalancing the weight of said bar. By moving the lever 59, the pressure is applied in the cylinder 35 either below or above the piston 37 and relieved on the opposite side, thus causing the housing to be tilted, and the rake elevated or depressed. By pressing down on either end of the plate 61, the pressure is admitted to one side of the piston 45 in the cylinder 44, and relieved on the opposite side, causing the piston-rod 48 to pull the rope 52 and thereby turn the unloader either to the right or left hand.

It will be noted, that the unloader requires but one operator, who can move the rake as described in any desired direction, and engage the cane on all portions of the car or flume within the range of the unloader; and that the cane can be transferred thereby onto the cane-carrier in such amounts as are best suited for feeding the mill.

I claim:

1. In a cane unloader, the combination of a housing, a rake bar movable longitudinally within the housing, a series of rollers located longitudinally of the housing beneath the rake bar and upon which the latter travels, and a similar series of rollers bearing against the upper surface of the rake bar, the rollers of the two series being arranged in staggered relation.

2. In a cane unloader, the combination of an elongated housing of substantially rectangular cross section, a rake bar within the housing, upper and lower series of rollers in contact with the rake bar at its upper and lower faces, said series of rollers being inclosed within the housing and arranged longitudinally of the latter, and other rollers in the housing which engage the rake bar at its side faces.

3. In a cane unloader, a housing, a rake attached to a bar, means for moving said bar longitudinally in said housing, and means for automatically counterbalancing the bar.

4. In a cane unloader, the combination of a standard, a housing supported intermediate of its length on said standard, a reciprocatory rake bar guided in the housing, a counterweight for the rake bar, and means for moving the rake bar and the counterweight in opposite directions.

5. In a cane unloader, the combination of a standard, a housing supported intermediate of its length on said standard, a reciprocatory rake bar guided in the housing, a sliding counterweight in the housing, and means for automatically moving the counterweight in rearward direction when the rake bar is advanced, and vice versa.

6. In a cane unloader, the combination of a standard, an elongated housing supported intermediate of its length on said standard, a reciprocatory rake bar guided in the housing, chains to drive the rake bar, a sliding counterweight, and a fluid pressure cylinder and piston supported on the housing above the standard and by means of which said chains and counterweight are operated.

7. In a cane unloader, the combination of a standard, a housing pivoted thereto to move in a vertical plane, a rake bar guided in the housing and carrying a rake at its forward end, a hydraulic cylinder supported in upwardly inclined position on the standard, and a piston in said cylinder connected with the housing in advance of the standard and operative to raise and lower the housing.

8. In a cane unloader, the combination of a longitudinally guided rake bar, a series of sprocket wheels arranged at opposite sides of the rake bar, a pinion mounted to drive two of said wheels, a hydraulic cylinder, a piston-carrying rack operated by said cylinder and engaging said pinion, and chains running on said sprocket wheels and connected with the rake bar.

9. In a cane unloader, the combination of a swiveled standard, a rake bar housing mounted thereon, an arm carried by the standard, a hydraulic cylinder, a piston in said cylinder, and a piston rod extending out of the cylinder at both ends and connected by flexible members with said arm.

In testimony whereof I have affixed my signature, in presence of two witnesses.

CHRISTIAN BOSSE.

Witnesses:
 ROBT. J. PRATT,
 GUST. NICOLAI.